United States Patent
Lu

Patent Number: 5,036,615
Date of Patent: Aug. 6, 1991

[54] FISHING FLOAT WITH FLASH INDICATORS

[76] Inventor: Shin-Yuang Lu, No. 123-2, Sung-Chiao Village, Kuan-Miao Hsiang, Tainan Hsien, Taiwan

[21] Appl. No.: 594,621

[22] Filed: Oct. 9, 1990

[51] Int. Cl.⁵ ............................................. A01K 93/02
[52] U.S. Cl. ........................................ 43/17.5; 43/17
[58] Field of Search ................................ 43/17.5, 17

[56] References Cited
U.S. PATENT DOCUMENTS 4,157,627  6/1979  Tschelisnik .................. 43/17.5
4,461,114  7/1984  Riead ............................ 43/17.5
4,827,655  5/1989  Reed ............................. 43/17.5

Primary Examiner—Richard K. Seidel
Assistant Examiner—Jeanne M. Elpel
Attorney, Agent, or Firm—Bacon & Thomas

[57] ABSTRACT

An electric fishing float with flash indicators comprising of an elongated tubular fishing float case containing a cell used as a power source, a light source, such as a plurality of light emitting diodes adjacent a closed top end of the case and a piston-like switch member mounted to reciprocate in the fishing float case between a first position to turn on the light source and a second position to turn off the light source in response to biting by a fish.

1 Claim, 2 Drawing Sheets

FISHING FLOAT WITH FLASH INDICATORS

BACKGROUND OF THE INVENTION

The present invention relates to an electric fishing float, and more particularly to a fishing float having indicators located within a closed upper end of an elongated float body which flash in response to biting by a fish.

In the electric fishing floats of the type described, it is most preferable to use as a light source a light emitting diode because it has strong resistance to impact and can eliminate the problem of disconnection of a filament of a lamp and, accordingly, has a semi-permanent service life. Light emitting diodes start emitting light when the voltage impressed exceeds about 1.7 V so that a cell capable of supplying about 2 V must be used. However each of the conventional mercury and manganese cells can supply the terminal voltage of only about 1.3 to 1.5 V so that at least two cells must be provided. As a result, the electric fishing floats become large in size and heavy in weight, resulting in poor response to biting by a fish.

The conventional electric fishing floats have a further problem in that the electric connection between the cell and the light source is not stable and reliable. More particularly, it has been difficult to securely hold the cell within a fishing float and to retain in position the contact members for electrically interconnecting the light source and the cell. Furthermore the replacement of a cell is difficult.

SUMMARY OF THE INVENTION

It is a primary object of the present invention to provide a fishing float having flash indicators which flash in response to biting by a fish.

It is another object of the present invention to provide an electric fishing float wherein the electrical interconnection between a power cell and a light source is highly stable, reliable and dependable in operation, and the replacement of a spent power call may be easily accomplished.

With the above objectives in view, the invention provides an electric fishing float with flash indicators comprised of an elongated tubular fishing float case containing, a cell used as a power source, and a light source, such as a plurality of light emitting diodes adjacent a closed top end of the case, and a piston-like switch member mounted in the fishing float case to reciprocate between a first position to turn on the light source and a second position to turn off the light source in response to biting by a fish.

DETAILED DESCRIPTION OF THE PREFERRED EMBODIMENT

Figure 1:
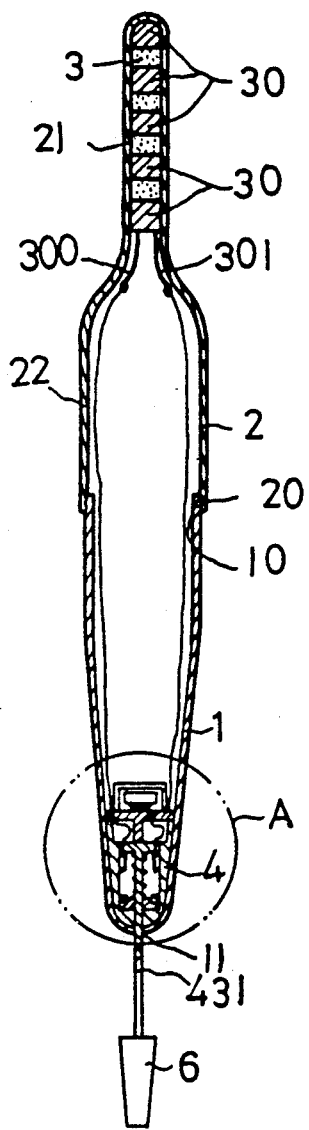
FIG. 1 is a cross-sectional view of a preferred embodiment of the present invention.
Figure 2:
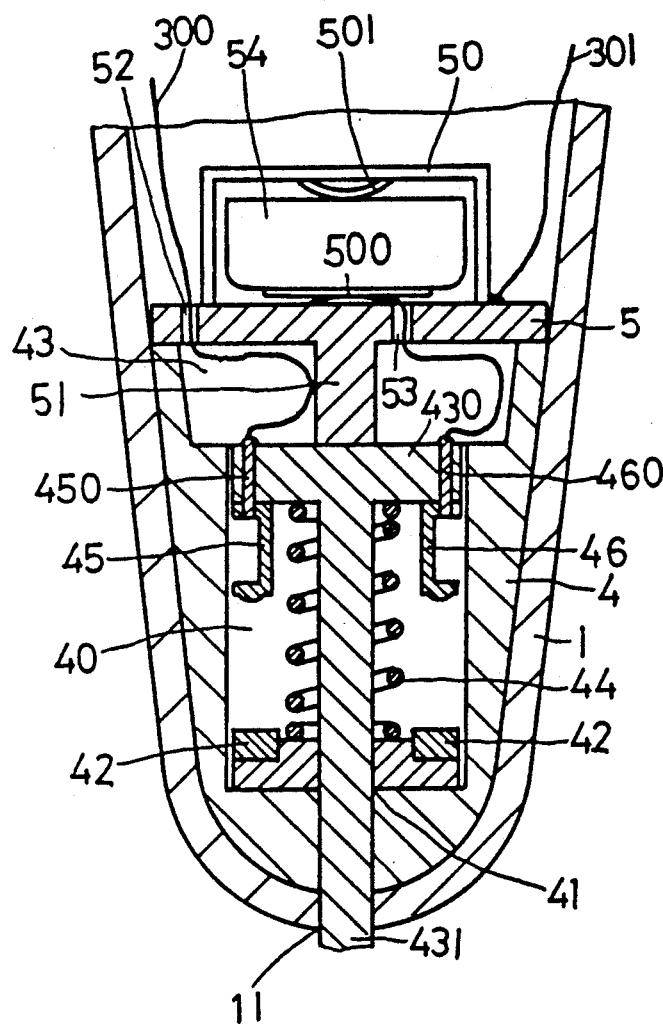
FIG. 2 is an enlarged cross-sectional view of a portion designated within the circle A shown in FIG. 1.
Figure 3:
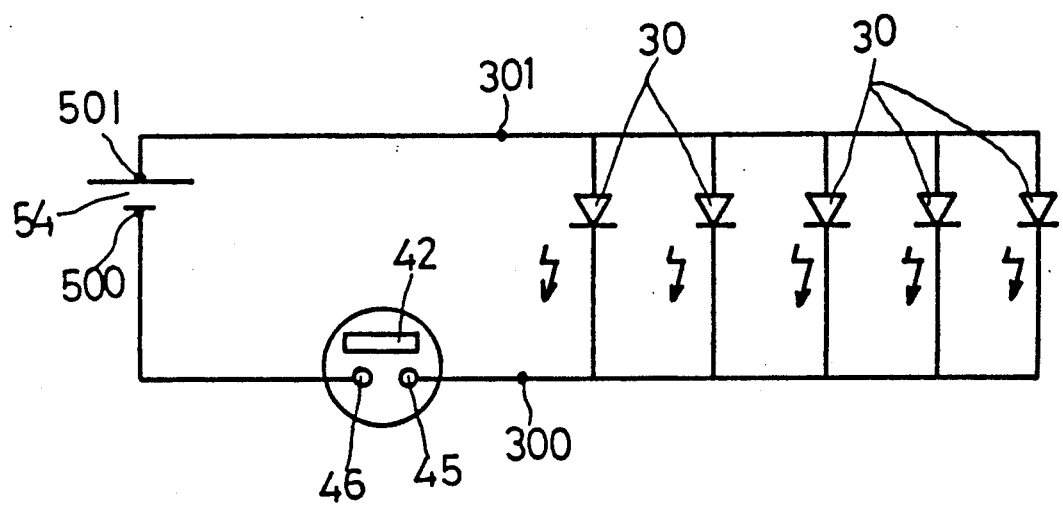
FIG. 3 is a schematic diagram of a control circuit used in the present invention.

Referring to FIGS. 1, 2 and 3, a fishing float with flash indicators according to the present invention comprises an elongated tubular case having an upper tubular case 2 and a lower tubular case 1. The upper tubular case 2 is made of a transparent synthetic resin and consists of a smaller diameter tubular section 21 with a closed top end and a larger diameter tubular section 22 with an open bottom end formed with an internal thread 20. The lower tubular case 1 is made of an opaque synthetic resin and has an open top end formed with an external thread 10 and is tapered downwardly to form a perforated bottom 11. An elongated leg member 431 is adapted to move in telescopic fashion in the lower tubular case 1 through the perforated bottom 11 along an axis of the elongated tubular case. A conical body 6 is releasably attached to bottom end of the leg member 431 by means of a thread engagement or other appropriate means for connection with a fishing line.

A light source 3 including a plurality of light emitting diodes 30 is placed in the small diameter tubular section 21 of the upper case 2 adjacent the closed top end thereof and is electrically connected in series or in parallel through lead wires 300, 301 to terminals of a battery or cell 54 in a manner to be hereinafter described in detail. A water-tight packing member 4 made of an electrically insulating material is snugly fitted in the lower portion of the lower tubular case 1. The packing member 4 is formed with a hollow space extending axially therethrough. Said hollow space includes, from top to bottom, a large diameter chamber 43, a cylindrical chamber 40 and a smaller diameter passage 41 axially in alignment with the bottom opening 11 of the lower tubular case 1.

The leg member 431 is at its upper end by with a flange head 430 of which the outer diameter is dimensioned slightly less than the diameter of the cylindrical chamber 40 of the packing member 4 to enable the flange head 430 to reciprocate in the cylindrical chamber 40. Two elongated contact members 45, 46, made of an electrically conductive material such as copper, are provided with upper plate portions 450, 460, which are press-fitted into two openings formed in outer portions of the flange head 430, and lower contact portions extending downwardly and outwardly from the lower ends of respective upper plate portions 450, 460. An electrically conductive ring member 42 is retained on the bottom of the cylindrical chamber 40. A coil spring 44 is sleeved on the leg member 431 and disposed between the flange head 430 and bottom of the cylindrical chamber 40 to retract the flange head 430 from a lower turn-on position, where the contact members 45, 46 contact the electrically conductive ring member 42, and an upper turn-off position where the contact members 45, 46 are separated from the ring member 42.

The battery or cell 54 is located in a battery chamber defined by a housing 50 which is made of an electrically conductive material and is releasably mounted on a base plate 5 which is made of electrically insulating material and is disposed on a circular top formed by an inner flange of the packing member 4, to upwardly space the base plate 5 from the flange head 430. A contact member 500 is positioning on a central portion of the base plate 5 and is in electrical contact with the negative electrode of the battery 54. Contact member 500 is electrically connected to the contact member 430 through a wire which extends through an opening 53 formed in the base plate 5. The housing 50 contacts the positive electrode of the battery 54 through a spring member 501. The lead wire 300 extends downwardly to connect the contact member 45 through an opening 52 formed in the base plate 5 and the housing 50. The lead wire 301 connects with housing 50 at base plate 5. The sections of wires located in the chamber 43 under the base plate 5 are maintained in a loose state so that the wires can be stretched while the flange head 430 moves from its turn-off position, into its turn-on position and are further separated from each other by means of a partition 51.

In response to biting by a fish, the fishing float of the present invention will flash to warn the fisherman using this device. Each biting by a fish moves the flange head 430 from its turn-off position into its turn-on position to close the electrical circuit and turn on the light source 3 when the leg member is pulled downwardly. After the biting force exerted on the leg member 431 is released, the coil spring 44 retracts the flange head from its turn-on position into its turn-off position to open the electrical circuit and turn off the light source 3. Continuous or repeated bitings by a fish causes the light source 3 to flash.

The battery 54 can be replaced in a very simple manner. Firstly, the conical body 6 can be detached from the leg member 431 then the upper and lower tubular cases 1, 2 can be separated from each other by disengaging the thread engagement of the internal and external threads 10, 20. By so doing, the battery housing 50 can be raised to an upper position close to the open top of the lower tubular case 1, thereby permitting the replacement of the cell or battery 54.

The invention provides a vary compact structure wherein only a single battery or cell 54 capable of producing a high electrical output may be used. For example, a single conventional lithium battery capable of supplying an output voltage of 3 V can be used, thereby overcoming the disadvantage of using two lower output batteries, as required by conventional float surfaces.

I claim:

1. A fishing float with flash indicators comprising:
   (a) an elongate tubular float case including an upper case section having a closed top end and a lower case section having bottom end provided with a bottom opening therein, the upper and lower case sections being secured to each other through a watertight connection therebetween;
   (b) a light source positioned in the upper case section adjacent the closed top end thereof;
   (c) an insulating packing member snuggly fitted within the bottom end of the lower case section, the packing member defining a cylindrical chamber and an axial passage disposed in alignment with the bottom opening, the axial passage interconnecting the cylindrical chamber and the bottom opening;
   (d) a piston-like member slidably disposed for axial reciprocation within the cylindrical chamber between a first position, wherein the piston-like member is retracted away from the bottom opening of the lower case section, and a second position, wherein the piston-like member is extended towards the bottom opening of the lower case section, the piston-like member including a rod extending axially therefrom of the exterior of the float case through the axial passage and bottom opening;
   (e) a conical body removably secured to an external end of the rod member for connection to a fishing line;
   (f) an electrically conductive ring member disposed within the cylindrical chamber;
   (g) a pair of contact members secured to the piston-like member, the contact members extending axially towards the ring member;
   (h) an electrically conductive battery housing within the lower case section, a power cell disposed within the battery housing, the power cell including a first electrode in electrical connection to one contact member and a second electrode in electrical connection to the battery housing;
   (i) a pair of lead wires for electrically connecting the light source with the battery housing and the other contact member; and
   (j) a coil spring mounted between the piston-like member and the bottom end of the lower case section for retracting the piston-like member from the second position wherein the contact members are in engagement with the electrically conductive ring member to close an electric circuit and activate the light source, and disposing the piston-like member into the first position wherein the contact members are disengaged from the ring member to open the electric circuit and deactivate the light source.

* * * * *